US008037030B2

(12) United States Patent
Saitoh

(10) Patent No.: US 8,037,030 B2
(45) Date of Patent: Oct. 11, 2011

(54) DATA MANAGEMENT APPARATUS, DATA MANAGEMENT PROGRAM AND DATA MANAGEMENT METHOD

(75) Inventor: Takashi Saitoh, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 365 days.

(21) Appl. No.: 11/764,863

(22) Filed: Jun. 19, 2007

(65) Prior Publication Data

US 2007/0294313 A1    Dec. 20, 2007

(30) Foreign Application Priority Data

Jun. 20, 2006   (JP) .................................. 2006-170515

(51) Int. Cl.
*G06F 17/30* (2006.01)
(52) U.S. Cl. ......... 707/665; 707/634; 707/667; 707/783
(58) Field of Classification Search .................. 707/1, 9, 707/10, 100, 104.1, 200, 205, 637, 667, 783, 707/803, 634, 665
See application file for complete search history.

(56) References Cited

U.S. PATENT DOCUMENTS

| | | | | |
|---|---|---|---|---|
| 6,567,180 B1* | 5/2003 | Kageyama et al. | ........... | 358/1.15 |
| 6,975,419 B2* | 12/2005 | Staas et al. | .................... | 358/1.15 |
| 7,130,068 B1* | 10/2006 | Ohta | ............................ | 358/1.15 |
| 7,137,099 B2* | 11/2006 | Knight et al. | .................. | 717/100 |
| 7,190,476 B2* | 3/2007 | Berkema et al. | ............. | 358/1.15 |
| 7,194,681 B1* | 3/2007 | Horvitz | .......................... | 715/236 |
| 7,200,748 B2* | 4/2007 | Kim et al. | ...................... | 713/168 |
| 7,251,047 B2* | 7/2007 | Meade, II | ..................... | 358/1.13 |
| 7,302,634 B2* | 11/2007 | Lucovsky et al. | ............. | 715/200 |
| 7,421,155 B2* | 9/2008 | King et al. | ..................... | 382/312 |
| 7,512,578 B2* | 3/2009 | Abnous et al. | .................. | 706/47 |
| 7,640,576 B2* | 12/2009 | Fukasawa | .......................... | 726/3 |
| 2005/0004989 A1* | 1/2005 | Satterfield et al. | ............ | 709/206 |
| 2006/0168074 A1* | 7/2006 | Gardner et al. | ............... | 709/206 |
| 2007/0146780 A1* | 6/2007 | Miwa | ........................... | 358/1.15 |
| 2007/0168514 A1* | 7/2007 | Cocotis et al. | ................ | 709/225 |
| 2007/0294313 A1* | 12/2007 | Saitoh | ............................ | 707/200 |

FOREIGN PATENT DOCUMENTS

| | | |
|---|---|---|
| JP | 2-13270 | 1/1990 |
| JP | 03-068980 | 3/1991 |
| JP | 2004-157285 | 6/2004 |

\* cited by examiner

*Primary Examiner* — Tim T Vo
*Assistant Examiner* — Dangelino Gortayo
(74) *Attorney, Agent, or Firm* — Turocy & Watson, LLP

(57) ABSTRACT

A technique discriminates important contents and less important contents and prevents a situation where folders are occupied by less important contents to make it impossible to register important contents from taking place. A mobile printing server comprises a personal important folder 2 that stores data, a personal non-important folder 3 that stores data, a data allocation section 5 that stores received data either in the personal important folder 2 or in the personal non-important folder 3 according to an allocation rule and a management section 7 that manages the data stored in the personal important holder 2 and the data stored in the personal non-important folder 3 according to the management rules provided for the respective folders.

5 Claims, 10 Drawing Sheets

FIG.8

ALLOCATION PRIORITY REDEFINITION- Microsoft Internet Explorer

FILE(F)  EDIT(E)  VIEW(V)  FAVORITE(A)  TOOL(T)  HELP(H)

ALLOCATION PRIORITY REDEFINITION

| ALLOCATION RULE | TIME/DATE OF REGISTRATION | EFFECTIVE/ INEFFECTIVE | RAISE PRIORITY | LOWER PRIORITY |
|---|---|---|---|---|
| ALLOCATION BY REGISTRAR | 2005/02/01 17:50 | ☐ |  | ☐ |
| ALLOCATION BY DOCUMENT ATTRIBUTE | 2005/03/05 13:50 | ☐ | ☐ | ☐ |
| ALLOCATION BY REGISTRAR'S ADDRESS | 2005/03/24 15:00 | ☐ | ☐ | ☐ |
| ALLOCATION BY RESPONSE MAIL AT REGISTRATION | 2005/04/06 09:32 | ☐ | ☐ | |

[ENTER] [RETURN]

WEB PAGE CAN BE DISPLAYED                                      INTERNET

ALLOCATION BY DOCUMENT ATTRIBUTE – Microsoft Internet Explorer

FILE(F)　EDIT(E)　VIEW(V)　FAVORITE(A)　TOOL(T)　HELP(H)

ALLOCATION BY DOCUMENT ATTRIBUTE

ALLOCATION BY DOCUMENT TYPE

WORD PROCESSOR DOCUMENT
- ◉ REGISTER TO PERSONAL IMPORTANT FOLDER
- ○ REGISTER TO PERSONAL NON-IMPORTANT FOLDER
- ○ DELETE

SPREADSHEET DOCUMENT
- ◉ REGISTER TO PERSONAL IMPORTANT FOLDER
- ○ REGISTER TO PERSONAL NON-IMPORTANT FOLDER
- ○ DELETE

PRESENTATION DOCUMENT
- ○ REGISTER TO PERSONAL IMPORTANT FOLDER
- ◉ REGISTER TO PERSONAL NON-IMPORTANT FOLDER
- ○ DELETE

ALLOCATION BY DOCUMENT SIZE

[500] KB　◉ LARGER　○ SMALLER

- ○ REGISTER TO PERSONAL IMPORTANT FOLDER
- ○ REGISTER TO PERSONAL NON-IMPORTANT FOLDER
- ○ DELETE

[ENTER] [RETURN]

INTERNIET

FIG.10

| ALLOCATION BY REGISTRAR'S ADDRESS – Microsoft Internet Explorer | | | |
|---|---|---|---|
| FILE(F)   EDIT(E)   VIEW(V)   FAVORITE(A)   TOOL(T)   HELP(H) | | | |

ALLOCATION BY REGISTRAR'S ADDRESS

| REGISTRAR'S ADDRESS | PERSONAL IMPORTANT F | PERSONAL NON-IMPORTANT F | OPERATION |
|---|---|---|---|
| 1111@××××.co.jp | ● | ○ | [DELETE] |
| 2222@××××.co.jp | ○ | ● | [DELETE] |
| 3333@××××.co.jp | ● | ○ | [DELETE] |
| @printspot.jp | ○ | ● | [DELETE] |
| _____@_____ | ○ | ○ | [REGISTER] |
| _____@_____ | ○ | ○ | [REGISTER] |
| _____@_____ | ○ | ○ | [REGISTER] |

DO NOT WRITE ANYTHING BEFORE @ WHEN SPECIFYING THE DOMAIN

[ENTER] [RETURN]

INTERNIET

ND DATA
DATA MANAGEMENT APPARATUS, DATA MANAGEMENT PROGRAM AND DATA MANAGEMENT METHOD

BACKGROUND OF THE INVENTION

1. Field of the Invention

This invention relates to a data management apparatus, a data management program and a data management method for storing received data in one of a plurality of storage folders according to the predetermined category that the data belong to and manages the stored data corresponding to the respective folders storing them. More particularly, the present invention relates to a data management apparatus, a data management program and a data management method adapted to be used for a mobile printing system constituted typically by way of the Internet in order to manage the data of the system.

2. Description of the Related Art

Printspot services are known mobile printing systems and already in operation (see, for example, Patent Document 1: Jpn. Pat. Appln. Laid-Open Publication No. 2005-267002). With a known mobile printing system, folders of data to be registered are provided to each user and the data to be printed are registered there. While the user can register data, persons other than the user him- or herself can also register data. Thus, for instance, the user can acquire annexed files transmitted to him or her by e-mail wherever the user may be.

Folders are provided to each user and an upper limit is defined to both the total number of files and the size of the total files. The user cannot utilize folders beyond the upper limits.

With known mobile printing systems, when a large number of sets of contents that is less significant such as those of contents of advertisements including direct e-mails have been registered for a user, there may arise a situation where important contents cannot be registered and hence cannot be printed due to the upper limit to the capacity of the folders of the user.

SUMMARY OF THE INVENTION

In view of the above-identified circumstances, it is therefore an object of the present invention to provide a technique of discriminating important contents and less important contents and preventing a situation where folders are occupied by less important contents to make it impossible to register important contents from taking place.

In an aspect of the present invention, the above object is achieved by providing a data management apparatus comprising: a first folder that stores data; a second folder that stores data; a data allocation section that stores received data either in the first folder or in the second folder according to an allocation rule; and a management section that manages the data stored in the first holder and the data stored in the second folder according to the management rules provided for the respective folders.

In another aspect of the present invention, there is provided a data management apparatus comprising: a second folder that stores data; a third folder that stores data; a data allocation section that stores received data either in the second folder or in the third folder; and a management section that stores predetermined information acquired from the data stored in the third folder in the second folder.

In still another aspect of the present invention, there is provided a data management program for causing the computer of a data management apparatus to manage data, the program comprising: a step that stores received data either in a first folder for storing data or in a second folder for storing data according to an allocation rule for allocating received data; and a step that manages the data stored in the first holder and the data stored in the second holder according to the management rules provided for the respective folders.

In still another aspect of the present invention, there is provided a data management method for causing the computer of a data management apparatus to manage data, the method comprising: a step that stores received data either in a first folder for storing data or in a second folder for storing data according to an allocation rule for allocating received data; and a step that manages the data stored in the first holder and the data stored in the second holder according to the management rules provided for the respective folders.

Thus, according to the present invention as defined above, it is possible to discriminate important contents (received data) and less important contents and prevent a situation where folders are occupied by less important contents to make it impossible to register important contents from taking place.

BRIEF DESCRIPTION OF THE DRAWINGS

FIG. 8 is a schematic illustration of an operation panel image displayed to a user for redefining the allocation rules by the attribute of document;

FIG. 9 is a schematic illustration of an optical panel image displayed to a user for redefining the allocation rules by attribute of document; and FIG. 10 is a schematic illustration of an operation panel image displayed to a user for redefining the allocation rules by the registrar's address (of the data sender).

DETAILED DESCRIPTION OF THE PREFERRED EMBODIMENTS

Now, preferred embodiment of the present invention will be described in greater detail by referring to the accompanying drawings, which is a mobile printing server system. With the mobile printing server system, each user holds a personal document folder (which corresponds to the first folder (personal important folder) as will be described in greater detail hereinafter). The number of files that can be stored in the personal document folder and the overall size of the folder are limited. In other words, if printing data supplied directly by contents providers are received unlimitedly, there can arise a situation where the user cannot register the data he or she really wants to print as well as other problems. Thus, in this embodiment, another folder for direct mail (which corresponds to the second folder (personal non-important folder)

as will be described in greater detail hereinafter) is provided to manage the direct mail documents and the documents that the user really wants to print separately in order to guarantee proper printing services to the user. With this arrangement, a certain service level is guaranteed to the user in terms of maximum number of registered files and the overall size of user's folders. This will be discussed in detail below.

Figure 1:
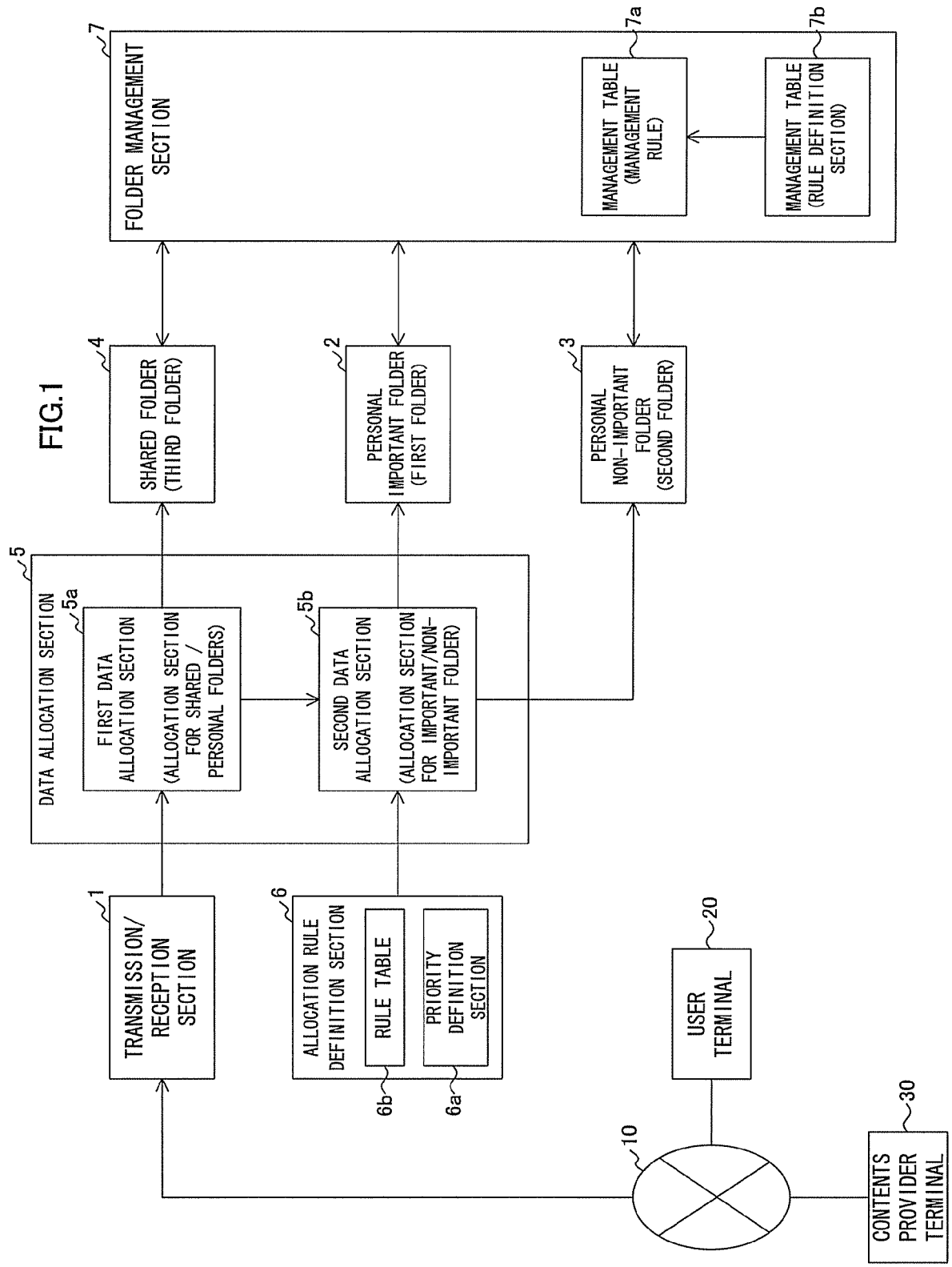
FIG. 1 is a schematic block diagram according to an embodiment of the present invention.

FIG. 1 is a schematic block diagram of the mobile printing server (data management apparatus) of this embodiment of the present invention. The mobile printing server of FIG. 1 comprises a transmission/reception section 1 connected to the Internet 10 and adapted to transmit data to and receive data from user terminals 20 and contents provider terminals 30, a personal important folder (first folder: personal document folder) 2, which is a document folder that stores (registers) the data received by the transmission/reception section 1, a personal non-important folder (second folder: personal direct mail folder) 3, which is a direct mail folder, a shared folder (third folder, shared direct mail folder) 4, which is a folder shared by a plurality of users, a data allocation section 5 that allocates the received data to these folders and have the plurality of received data stored (registered) in the corresponding folders, an allocation rule definition section 6 that defines the allocation rule for the purpose of allocation of the data received by the data allocation section 5 to the corresponding folders on a table (allocation rule table) and a folder management section 7 that manages the data stored (to be expressed as registered) in the folders, associating the data and the corresponding folders.

The data allocation section 5 includes a first data allocation section 5a and a second data allocation section 5b. When a document customized to the user or a document common to a plurality of users is received, the first data allocation section 5a allocates the received data to the shared folder 4. When, on the other hand, any other data is received, the first data allocation section 5a allocates the received data to the second data allocation section.

The second data allocation section 5b allocates contents (e.g., received data such as document data) that are regarded as highly important according to the allocation rule, which will be described in greater detail hereinafter, to the personal important folder 2, whereas it allocates contents (e.g., received data such as printed direct mail data) that are regarded as less important to the personal non-important folder 3.

Additionally, the data allocation section 5 includes a priority definition section 6a that defines the priority of each rule when a plurality of allocation rules are used in order to prevent contradictions from arising when applying these rules.

The folder management section 7 manages the folders by means of the management rule described in a management table 7a and includes a management table definition section (management rule definition section) 7b that can define and redefine the management table 7a.

The shared folder 4 operates as means for effectively holding a document common to a plurality of users when the document is registered to a plurality of folders simultaneously. Then, the documents held in the shared folder 4 are provided with indexes so that each person can conveniently utilize the direct mail documents.

The allocation rule that the data allocation section 5 uses is defined by means of a rule table 6b. The business logics of the system are installed according to the rule.

The data allocation rule typically includes the following provisions.

Registrations from the registrar or registrars specified in advance on the rule table 6b (whose e-mail address is or e-mail addresses are, whichever appropriate, registered in advance) and registrations from the contents provider or contents providers specified by the user are made to the personal non-important folder 3.

When a contents provider or a third party makes registration, the registering party indicates that it is a direct mail registration so that the registration may be made not to the personal important folder 2 but to the personal non-important folder 3.

In order to discriminate direct mails in advance, a sub-domain is assigned to the e-mail addresses for registration and the documents sent to the sub-domain are registered to the personal non-important folder 3.

Alternatively, in order to discriminate direct mails in advance, a sub-domain is assigned to the e-mail addresses for registration and the documents sent to other than the sub-domain are registered to the personal non-important folder 3.

Now, the management rule that the folder management section 7 uses will be described below.

The personal non-important folder 3 is subjected to limitations in terms of service level and the registered data of the folder 3 are updated according to the management rule in order to keep the definition of the number of files that can be registered and that of the overall size of the folder. The business logics of the system are installed according to the rule.

Now, the management rule will be described further by way of an example.

For example, the registration of a document is cancelled by sending a reply to the registration completion notification that is transmitted when the document is registered to the personal non-important folder 3. The cancellation is realized by a user operation from the document management image of the web. A document is held with priority when the user specifies priority holding of the document from the document management image of the web when a cancellation operation is conducted with the limitation. It may be so arranged that the documents of a registrar who is defined by the user as priority contents provider or a priority registrar in advance are held with priority.

Additionally, it may be so arranged that a document is registered to the personal important folder 2 at the time of registration but the folder management section 7 transfers it to the personal non-important folder 3 as the user replies to the registration completion notification e-mail when he or she receives the latter.

Furthermore, it may be so arranged that a document is discarded (deleted) when the expiration data of the document comes if such an expiration data is defined in advance. Similarly, it may be so arranged that any document is not received for registration when limitations to registration are already in effect or that the document to be deleted is actually deleted according to the management rule when limitations to registration are already in effect and some other document is to be authorized for registration.

Similarly, it may be so arranged that the data of a document is transferred from the personal important folder 2 to the personal non-important folder 3 by means of a user operation on the image management image of the web, which will be described hereinafter.

There may be a mode of utilization that the size of the personal important folder 2 and that of the personal non-important folder 3 are defined separately and the user is authorized or not authorized to alter any of the sizes. There may be a mode of utilization that each of the sizes is manually or automatically altered according to the status quo of utilization of the system by the user such as the number of times by which the user has paid for services. Furthermore, they may be a mode of utilization that the ratio of the sizes is automatically altered according to the status quo of utilization of the system by the user such as the number of times by which the user has paid for services.

Figure 2:
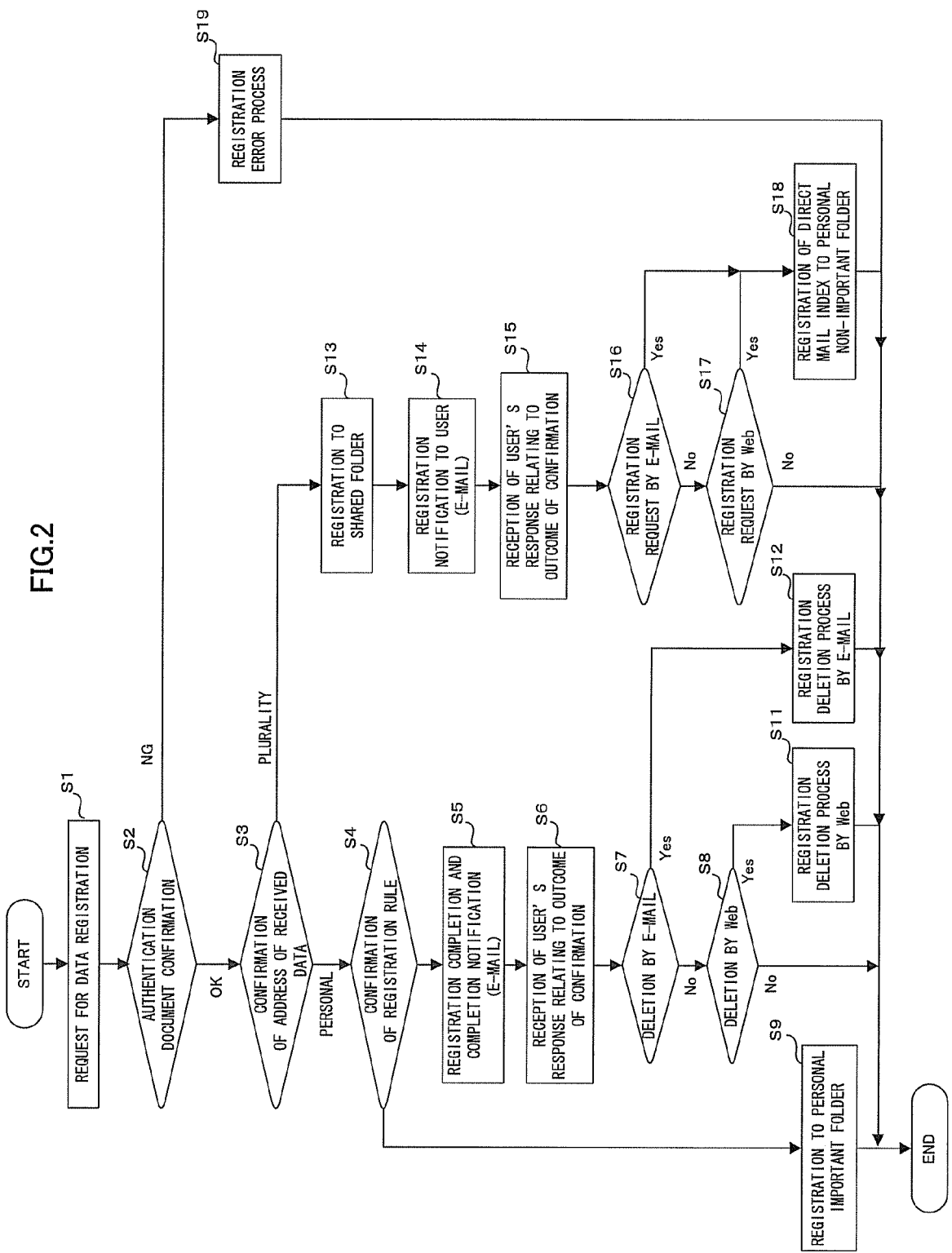
FIG. 2 is a flowchart of the overall operation according to the embodiment of FIG. 1.

Now, the overall operation of the embodiment will be described below by referring to the flowchart of FIG. 2.

As a request for registration is made (S1), the user is subjected to an authentication process (S2) and, as the user is positively authenticated (S2, OK) and there is a received data addressed personally to the user (S3, personal), the first data allocation section 5a transmits the received data to the second data allocation section 5b and the second data allocation section 5b refers to the allocation rule according to the received data (S4) and registers the data either to the personal important folder 2 or the personal non-important folder 3 (S9, S5).

When the data is registered to the personal non-important folder 3 (S5), a registration completion notification is transmitted to the user of the folder by e-mail to have the user confirm the contents of the data and receives the user's response relating to the outcome of the confirmation (S6). When a directive for canceling the registration of the data is received from the user (S7 or S8, Yes), the registration is cancelled (S12 or S11). The response may be by e-mail (S7) or by means of the web (S8). If there is not any directive for cancellation (S7 or S8, No), the data is registered to the personal non-important folder 3. If such is the case, the data remains registered until when a directive is issued by the user to cancel the registration, when a predetermined time period elapses or when the memory capacity becomes over because of a new data registration.

When, on the other hand, there is a received data addressed to a plurality of users (S3, plurality), the first data allocation section 5a registers the received data to the shared folder 4 (S13).

As the received data is registered to the shared folder 4, a registration completion notification is transmitted to all the persons who share the folder by e-mail (S14) to have each of the users confirm the contents and receives the user's response relating to the outcome of the confirmation (S15) and, if there is a directive for registration from the user (S16 and S17, Yes) in the response, predetermined information (e.g., attribute information) is extracted from the registered data as index, which is then registered to the personal non-important folder 3 (S18).

If, on the other hand, there is not any directive, requesting registration (S16 or S17, No) from any of the users, the process is simply ended. When the user is not positively authenticated in Step S2, a registration error step is executed (S19) and the process is ended.

When a user's directive is received for viewing the data in the personal non-important folder 3 after the above-described registration process, the index of the data is displayed. If there is a user's directive for printing the data, the real data is acquired from the shared folder 4 and a printing process is executed.

The index contains information on the document, the name of the shared folder to which the document is registered and document information such as the file name and is referred to at the time of utilization. Thus, the document registered to the shared folder 4 are discriminated from the documents that are registered for a person.

The directives from the user including requests for registration may be issued by means of e-mail or by means of the web. No index is registered to the personal non-important folder 3 of a user unless there is a directive that requests registration from the user. The data registered as index remains registered until when a directive is issued by the user to cancel the registration, when a predetermined time period elapses or when the memory capacity becomes over because of a new data registration like any other data registered to the personal non-important folder 3.

Figure 3:
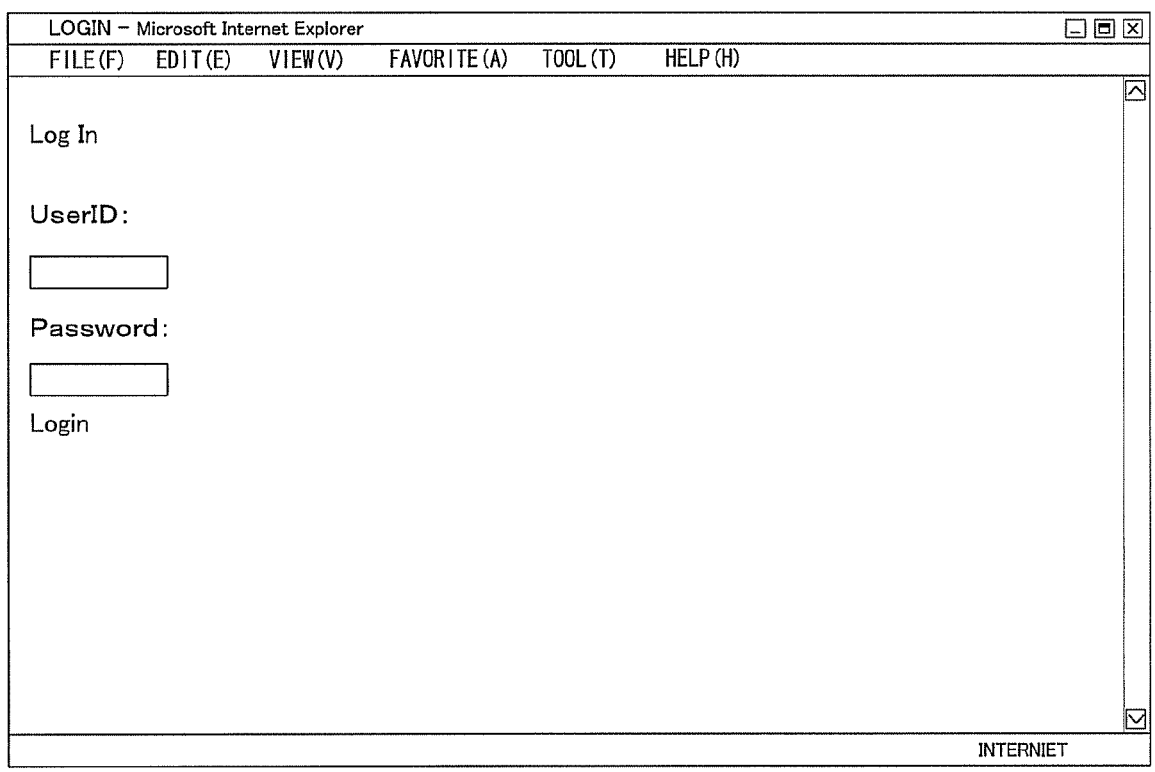
FIG. 3 is a schematic illustration of an operation panel image displayed to a user for logging in to a mobile printing server system.

FIG. 3 is a schematic illustration of an operation panel image displayed to the user for logging in to a mobile printing server system. In the image, the user inputs the user ID and the password for logging in. Then, as the user is positively authenticated, he or she can make various definitions for utilizing the service.

Figure 4:
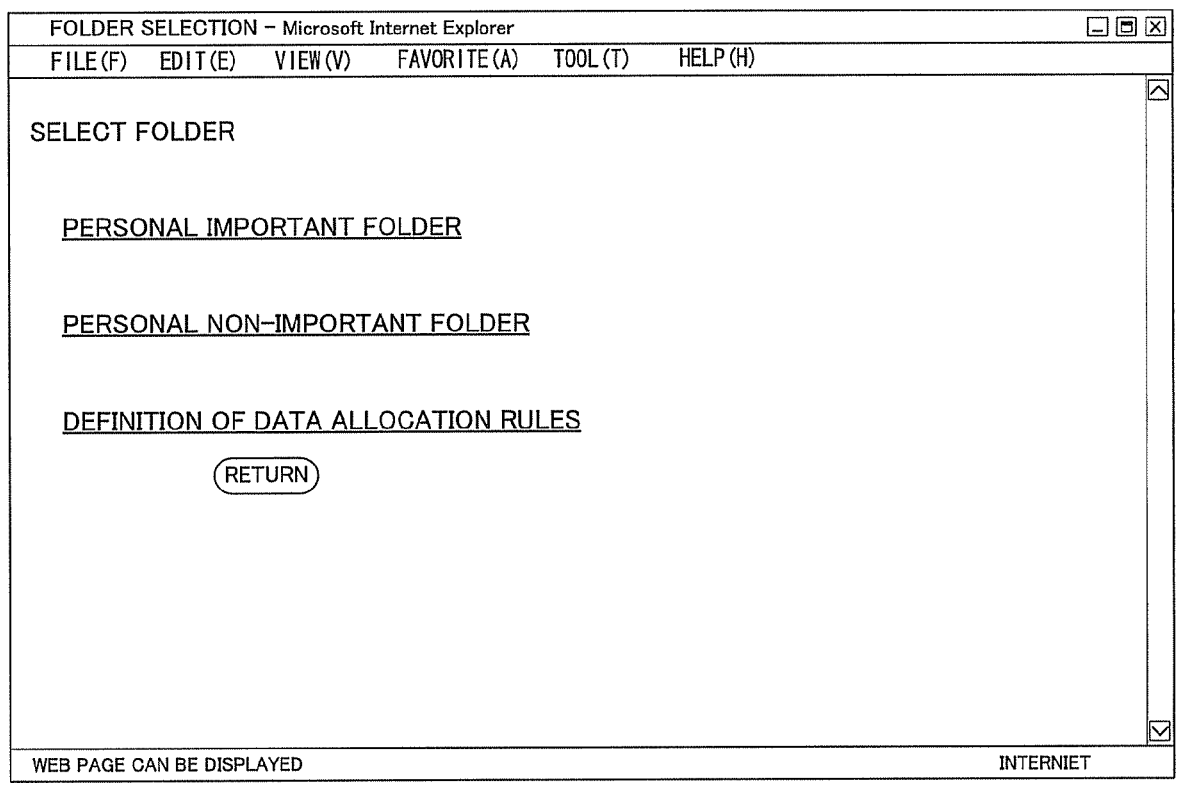
FIG. 4 is a schematic illustration of an operation panel image displayed in response to a login.

FIG. 4 is a schematic illustration of an operation panel image displayed in response to a login. The operation panel image includes items for accessing a viewing/operation panel image for the personal important folder 2, a viewing/operator panel image for the personal non-important folder 3 and an image for redefining the allocation rules. Thus, the user can view the contents of the personal important folder 2 or those of the personal non-important folder 3 by selecting either of headings for them. Additionally, the user can redefine the rules for data allocation by selecting the heading for redefinition of the allocation rules.

Figure 5:
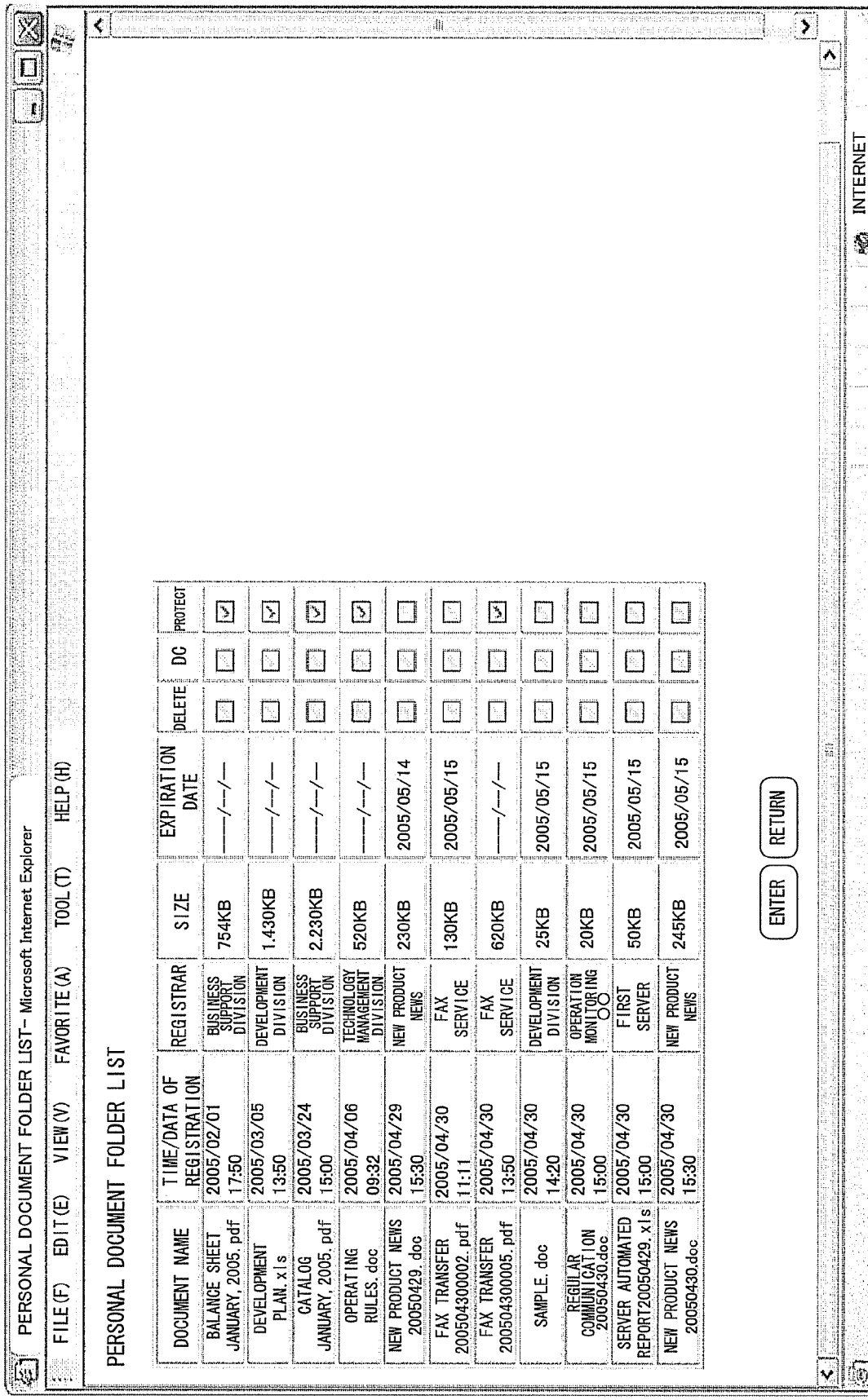
FIG. 5 is a schematic illustration of an operation panel image displayed to a user for viewing/manipulating a personal important folder 2.

FIG. 5 is a schematic illustration of an operation panel image displayed to the user for viewing/manipulating a personal important folder 2. A list of a plurality of file data registered in the personal important folder 2 is displayed in the image. The list contains file data (status of each document) and check boxes for selecting and specifying one of the actions that the user can take for the purpose of managing each of the data.

The status of each document includes the registered name of the document, the date of registration, the registrar's name, the size of the document and the expiration date of the document. Of these, the expiration date of the document is normally defined at the time of registration. However, no expiration date is defined when the document is protected.

The check boxes for selecting and specifying any of the actions that the user can take, including one for deleting the document, one for moving the document to the direct mail box and one for protecting the document and the user can check one of the boxes he or she wants to use. The user can leave the check boxes unchecked. As one of the check boxes is selected and the enter key is clicked, the selected action is actually taken.

Figure 6:
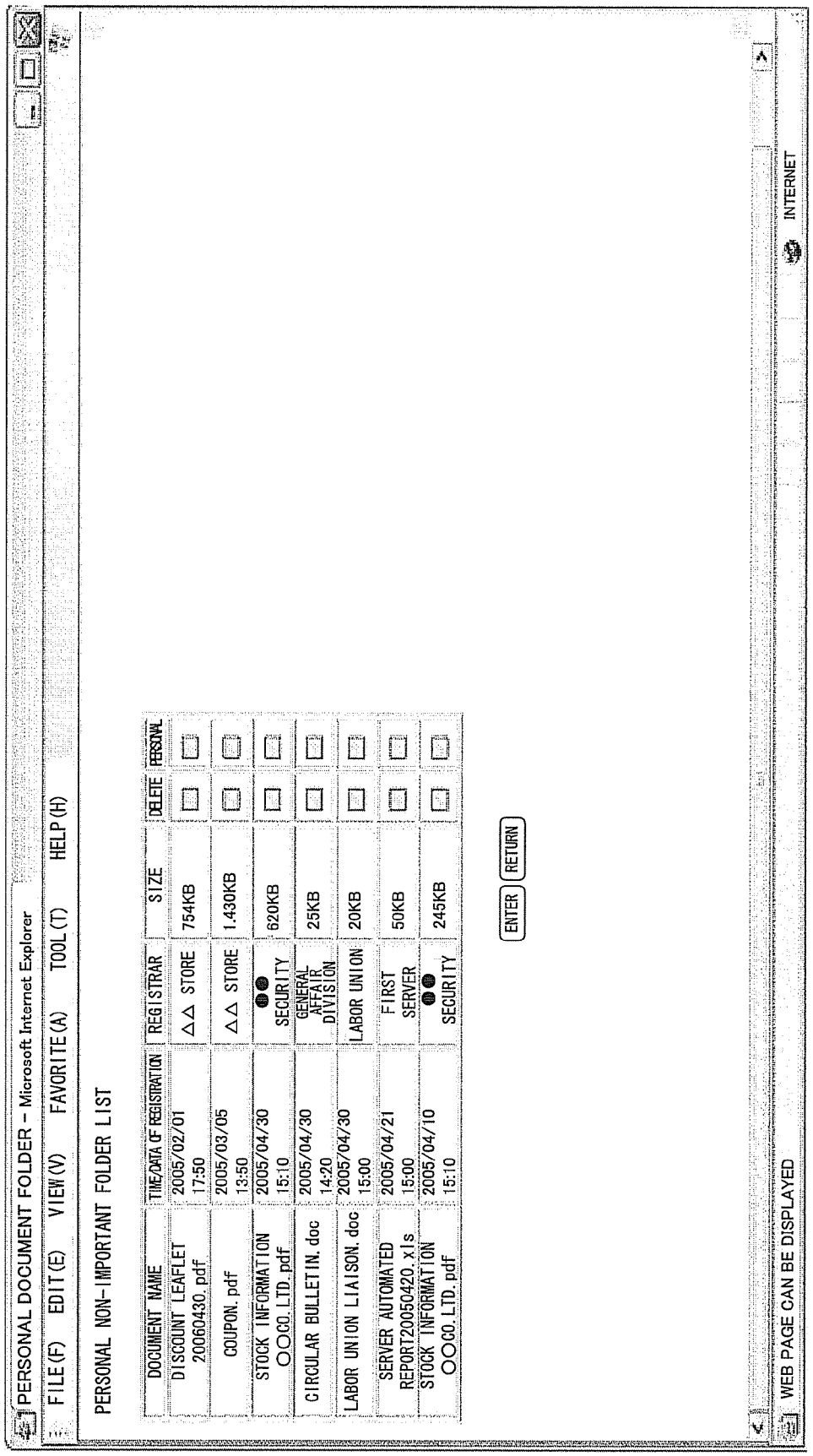
FIG. 6 is a schematic illustration of an operation panel image displayed to a user for viewing/manipulating a personal non-important folder 3.

FIG. 6 is a schematic illustration of an operation panel image displayed to the user for viewing/manipulating a personal non-important folder 3. The image contains the plurality of file data registered to the personal non-important folder 3 and the index or indexes of the data that the user requested to register out of the data (real data) registered to the shared folder 4. While the image contains the data registered to the personal non-important folder 3 and the data registered to the shared folder 4 are displayed indiscriminately. They may be discriminated from each other and displayed.

Like the image of FIG. 5, the image of FIG. 6 contains file data (status of each document) and check boxes for selecting and specifying one of the actions that the user can take for the purpose of managing each of the data. The status of each document includes the registered name of the document, the date of registration, the registrar's name and the size of the document. The check boxes for selecting and specifying either of the actions that the user can take, including one for deleting the document and one for moving the document to the personal important folder 2 and the user can check one of the boxes he or she wants to use. The user can leave the check boxes unchecked. As either of the check boxes is selected and the enter key is clicked, the selected action is actually taken.

Figure 7:
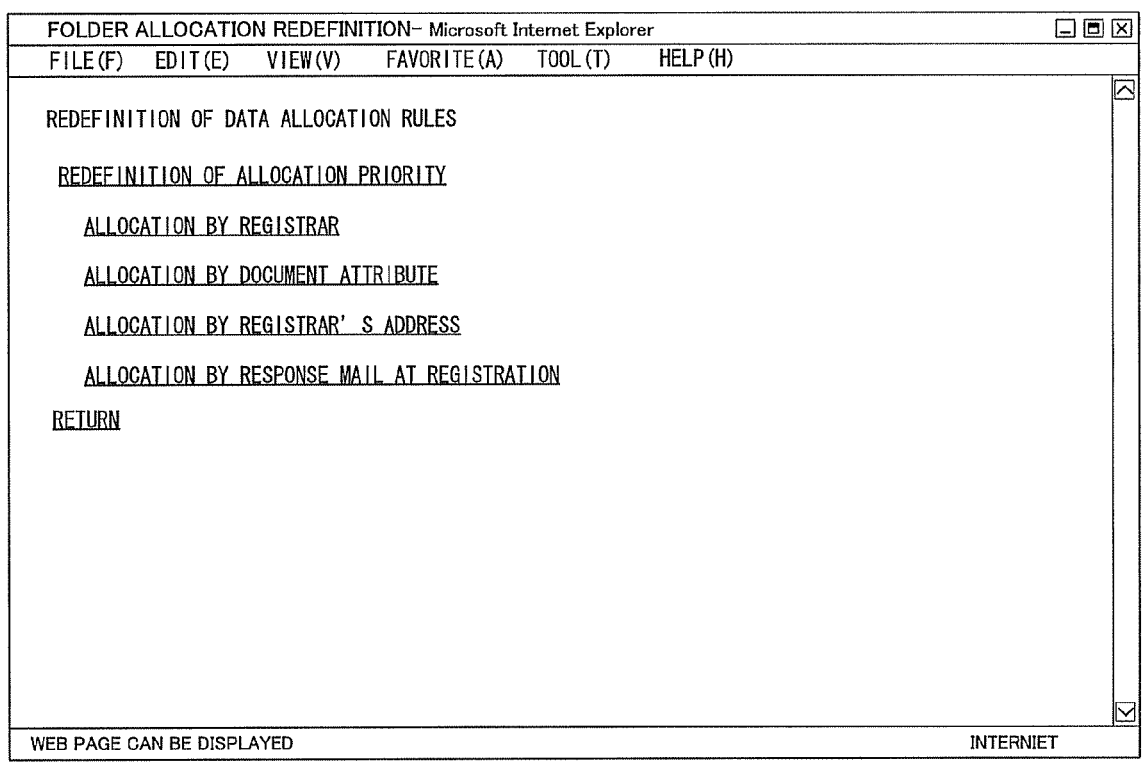
FIG. 7 is a schematic illustration of an operation panel image displayed to a user for redefining the allocation rules.

FIG. 7 is a schematic illustration of an operation panel image displayed to a user for redefining the allocation rules. This image includes heading for accessing a redefinition panel image for redefining the allocation rules and allocation priority redefinition panel images for redefining the priority of the allocation rules so that the user can redefine the priority of allocation and each of the allocation rules.

As for the allocation rules, the tiles of the rules of allocation by registrar, allocation by document attribute, allocation by the address of registrar (transmitter) and allocation by the reply mail at the time of registration are provided.

FIG. 8 is a schematic illustration of an operation panel image displayed to a user for redefining the rules of allocation by the attribute of document. The user can redefine the priority for the above listed plurality of allocation rules. The image includes an item of the date of registration of the rule, an item for making effective or ineffective, an item for raising the priority and an item for lowering the priority. The allocation rules are listed in the descending order of priority. Each of the rows of the rules includes the date of registration of the rule and check boxes for actions that the user can take for the purpose of making the rule effective or ineffective and raising or lowering the priority. The selected action is actually taken when the corresponding check box is checked and the enter key is clicked.

FIG. 9 is a schematic illustration of an optical panel image displayed to a user for redefining the allocation rules by attribute of document. The allocation rules can be redefined either in terms of type of document or in terms of size of document. The types of documents include the word processor documents, the spreadsheet documents and the presentation documents and the user can register or delete the documents of each type.

As for the sizes of documents, the user is prompted to select documents of a predetermined size and larger and then either to register the selected documents to a folder or to delete them.

FIG. 10 is a schematic illustration of an operation panel image displayed to a user for redefining the allocation rules by the registrar's address (of the data sender). This image is displayed when allocation by the registrar's address is selected in the image of FIG. 9. The user redefines the allocation rules by way of the registrar's address.

More specifically, the user can input the e-mail address of the registrar of each registered document. An e-mail address can be selected be specifying the account part before @ and/or the domain part after @. As an e-mail address is selected, the user can redefine the allocation rules that are applied to the registration made by way of the selected address. When only the account part is specified, it is possible to redefine the allocation rules applicable to all the registrations made by way of that address. When only the domain part is specified, it is possible to redefine the allocation rules applicable to all the registrations made by way of that address.

As described above, with this embodiment of the present invention, it is possible to reduce the problem that important data cannot be registered by providing a main folder that corresponds to a personal important folder 2 and a sub folder that corresponds to a personal non-important folder 3 for mobile printing and registering low priority printing data to the sub folder.

As for registrations to the main folder and the sub folder, each registration is automatically allocated either to the main folder or the sub folder as the user redefines the allocation rules in advance. Additionally, the user can move any data that has been registered to the sub folder to the main folder or vice versa at his or her will. Thus, the present invention provides the user with means for easily handling data to be registered and those that are not to be registered.

Thus, this embodiment provides a mobile printing system that can be defined as follows.

A mobile printing system of this embodiment is characterized by comprising a means (main holding means) for holding a plurality of data to be printed collectively in a folder on a network, a means for taking out any of the data held in the folder whenever necessary and a means (sub holding means) for holding a plurality of data to be temporarily held under the same management system.

Preferably, a mobile printing system of this embodiment is characterized by further comprising a means for managing (moving, deleting, etc.) each of the data held on the network either in the main holding means or in the sub holding means or in both of them.

Preferably, in a mobile printing system as defined above, allocation rules are defined in advance for allocating data to be registered either to the main holding means and the sub holding means and each registered data is assigned either to the main holding means or to the sub holding means or deleted according to the allocation rules.

Preferably, in a mobile printing system as defined above, the size of the main holding means and that of the sub holding means are defined separately and the user cannot alter either of them.

Preferably, in a mobile printing system as defined above, the size of the main holding means and that of the sub holding means are defined separately and either or both of them can be altered automatically or manually according to situations such as a situation of utilization of the system by the user where the user has paid for a service for more than a predetermined number of times.

Preferably, in a mobile printing system as defined above, the total size of the main holding means and the sub holding means is constant and the user can alter the ratio of the means.

Preferably, in a mobile printing system as defined above, the total size of the main holding means and the sub holding means is constant and automatically altered according to situations such as a situation of utilization of the system by the user where the user has paid for a service for more than a predetermined number of times.

Preferably, in a mobile printing system as defined above, when a data that is common to a plurality of persons is held, the real data is put neither into the main holding means nor into the sub holding means but only management information of the data is managed like other data and the real data is shared by the persons.

While the function of the embodiment is installed in an apparatus in advance in the above description of the embodiment, the present invention is not limited thereto and the function of the embodiment can be downloaded from a network or installed from a recording medium storing it. Any computer-readable recording mediums that can store a program such as CD-ROM can be used for the purpose of the present invention. Additionally, the function that is installed in advance or downloaded may be so adapted to be realized by cooperating with the OS (operating system) in the apparatus where it is installed.

What is claimed is:

1. A mobile printing server comprising:
a first folder that stores data;
a second folder that stores data;
a third folder that stores data;
a data allocation section that stores received data either in the first folder or in the second folder according to an allocation rule so that the data stored in the first folder are data to be printed and the data stored in the second folder are data to be temporarily stored;

a management section that manages the data stored in the first folder and the data stored in the second folder according to management rules provided for the respective folders; and an allocation rule definition section that changes and defines the allocation rules to be referred to by the data allocation section, and includes a priority definition section that defines a priority to be used for the plurality of allocation rules, wherein the data allocation section being adapted to store a received predetermined data in the third folder, the management section being adapted to store predetermined information acquired from the predetermined data stored in the third folder, wherein the management section conducts a viewing of data information stored in the third folder for the purpose of viewing data information stored in the second folder according to the predetermined information, wherein when a request for a predetermined process on the data indicated by the data information stored in the third folder is received for the purpose of viewing data information stored in the second folder, the management section executes a process on the data indicated by the data information stored in the third folder according to the request for a process, wherein as the received data is registered as registered data in the third folder, if there is a directive for registration from a user, predetermined information is extracted from the registered data as an index which is registered to the second folder, wherein when a user's directive for viewing is received for viewing data in the second folder, the index is displayed, when there is a user's directive for printing data, real data is acquired from the third folder and a printing process is executed, wherein the third folder is accessible by a plurality of users and the first and second folders are accessible only by a specific user, wherein when a document customized to the user or a document common to the plurality of users is received, the data allocation section allocates the received data to the third folder; and wherein a document registered to the first folder is transferred to the second folder in response to a registration completion notification email received from a user.

2. The mobile printing server according to claim 1, wherein the data allocation section allocates the received data either to the first folder or the second folder according to any of a registrar, a specified attribute of a document of the data, a registered address and a directive of user that are defined as the allocation rules.

3. The mobile printing server according to claim 2, wherein the attribute of document includes either a type of document or a size of document.

4. The mobile printing server according to claim 1, wherein the management section notifies the user of the registration of a data to the second folder and deletes the data registered to the second folder and specified by a directive of the user.

5. A data management program embodied on a non-transitory computer-readable recording medium causing a computer of a mobile printing server to manage data, the program comprising:

a data allocation step that stores received data either in a first folder storing data or in a second folder storing data according to an allocation rule used in allocating of received data so that the data stored in the first folder are data to be printed and the data stored in the second folder are data to be temporarily stored;

a management step that manages the data stored in the first folder and the data stored in the second folder according to management rules provided for the first and second folders; and an allocation rule definition step that changes and defines the allocation rules to be referred to in the data allocation step, and includes a priority definition step that defines a priority to be used for the plurality of allocation rules, wherein for a third folder that holds data, the data allocation step is adapted to store a received predetermined data to the third folder, the management step being adapted to store the predetermined information acquired from the predetermined data stored in the third folder to the second folder, the management step conducts a viewing of data information stored in the third folder for the purpose of viewing data information stored in the second folder according to the predetermined information, wherein when a request for a predetermined process on the data indicated by the data information stored in the third folder is received for the purpose of viewing data information stored in the second folder, the management step executes a process on the data indicated by the data information stored in the third folder according to the request for a process, wherein as the received data is registered as registered data in the third folder, if there is a directive for registration from a user, predetermined information is extracted from the registered data as an index which is registered to the second folder, wherein when a user's directive for viewing is received for viewing data in the second folder, the index is displayed, when a user's directive for printing data is received, real data is acquired from the third folder and a printing process is executed, wherein the third folder is accessible by a plurality of users and the first and second folders are accessible only by a specific user, wherein when a document customized to the user or a document common to the plurality of users is received, the data allocation step allocates the received data to the third folder; and wherein a document registered to the first folder is transferred to the second folder in response to a registration completion notification email received from a user.

* * * * *